United States Patent [19]

Ohara et al.

[11] Patent Number: 4,468,439

[45] Date of Patent: Aug. 28, 1984

[54] BATTERY LOADING DEVICE

[75] Inventors: Tsunemasa Ohara, Tokyo; Masayuki Suzuki, Kanagawa, both of Japan

[73] Assignee: Canon Kabushiki Kaisha, Tokyo, Japan

[21] Appl. No.: 421,405

[22] Filed: Sep. 22, 1982

[30] Foreign Application Priority Data

Oct. 15, 1981 [JP] Japan .......................... 56-153940[U]
Nov. 10, 1981 [JP] Japan .......................... 56-180203

[51] Int. Cl.³ ............................................. H01M 2/20
[52] U.S. Cl. ......................................... 429/1; 429/99
[58] Field of Search .................................. 429/96–100, 429/96–100, 429/1

[56] References Cited

U.S. PATENT DOCUMENTS

| | | | |
|---|---|---|---|
| 3,856,577 | 12/1974 | Oki et al. | 429/96 |
| 3,887,393 | 6/1975 | La Rue, Jr. | 429/99 |
| 4,125,681 | 11/1978 | Sjogren | 429/99 |
| 4,383,007 | 5/1983 | Murphy | 429/96 X |

Primary Examiner—Anthony Skapars
Attorney, Agent, or Firm—Toren, McGeady and Stanger

[57] ABSTRACT

A battery loading device for loading a power source battery, built in small appliances having a battery loading chamber for selectively loading a number of cylindrical unit batteries or a one body type battery having the same voltage as a number of cylindrical unit batteries, whereby the one body type battery and the battery loading chamber are shaped similarly and asymmetrically in order to prevent the one body type battery from being inserted in the wrong direction.

4 Claims, 9 Drawing Figures

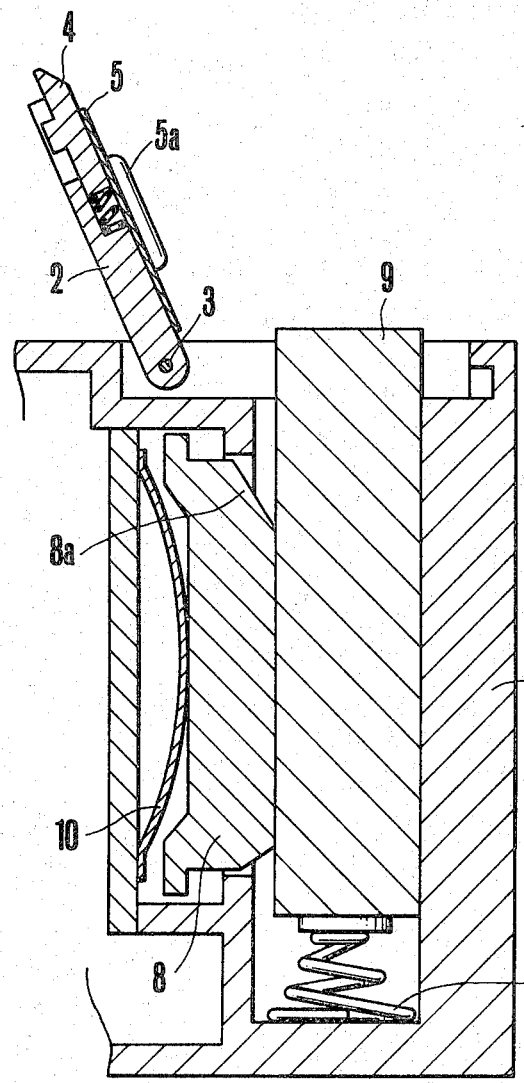

BATTERY LOADING DEVICE

BACKGROUND OF THE INVENTION

1. Field of the Invention

The present invention relates to a loading device for loading the power source battery, into small appliances having an electrical circuit such as a camera, particularly having a battery loading chamber for loading a number of cylindrical batteries as well as a one body type battery.

2. Description of the Prior Art

Until now, a power source has been built into the camera or the like using a number of cylindrical unit batteries, whereby they are placed in parallel due to loading space. When the cylindrical unit batteries are placed adjacent to each other there is a surplus space between the unit batteries. In order to make use of this surplus space for the battery, a one body type battery has been proposed into which a number of unit batteries are shaped. For example, when two cylindrical unit batteries are shaped into a one body type battery with an elliptical section, the latter has a larger capacity using the same amount of space and is easier to handle. Furthermore, appliances in which two manganese or alkali manganese dry batteries each having 1.5 V of the electromotive force are connected in series in order to obtain 3 V of the electromotive force, using the one body type, for example, a lithium battery having 3 V of electromotive force is used, a larger capacity can be obtained with the same volume. This is quite convenient in building the power source into small appliances.

By choosing the total length, the total width, and the arrangement of electrodes of such a one body type battery to correspond to the size of the corresponding number of cylindrical unit batteries, it is possible to obtain interchangeability. The chamber for loading a number of unit batteries or a one body type battery can be elliptical because the positions of the electrodes are the same.

For the battery loading device capable of loading batteries of different shapes it is necessary to provide a protective means against accidental misloading of the battery in order to protect the appliance body, while the construction of the electrodes of the loading chamber is such that the power can be effectively delivered from two kinds of batteries to the electrical circuit of the appliance body. Especially for the one body type battery into which a number of unit batteries are shaped, the positive electrode and the negative electrode of the battery are in parallel on one end surface, whereby it is necessary that the electrodes are in contact with the contacts in the loading chamber whereby the battery is loaded and therefore miscontact must be prevented in advance when the battery is loaded in the wrong direction.

In a conventional battery loading device it is difficult to maintain the reliability of the electrode contact of the one body type battery of the present invention which has the positive electrode and the negative electrode on one end surface. Namely, until now as a means for detecting the diameter of the positive electrode and that of the negative electrode of the battery, for example, an insulating contact member is around the fixed terminal in such a manner that a battery electrode larger in the diameter than the determined battery electrode can not be brought in contact with the fixed terminal. However, when such means is used for the one body type battery, the battery is inclined in the battery chamber because the contact terminal is fixed or inferior contact can easily take place due to manufacturing error in the position of the battery electrodes, particularly their projection amount which may deviate from the normal.

Consequently, contacts are needed which are independently movable for the positive electrode and the negative electrode to produce a certain determined contact pressure even if the battery is inclined or if there is an error in the battery electrode. However, if the contacts in contact with the battery electrodes are movable in this way it is difficult to detect the positive and the negative electrode. For example, as a conventional means the contacts are made of springs on whose contact surfaces the electrode detectors are provided. However, due to the complicated construction it is a problem to provide the small appliances with them in view of the cost and space.

On the other hand, even if the reliability of the contact of the above electrodes and the means against counter-conduction by detecting the positive and the negative electrode are satisfied, another problem remains in order to use the one body type battery and cylindrical batteries commonly. Namely, in the device in which a number of cylindrical batteries are connected in series, a conductive member for connecting the negative electrode of one battery to the positive electrode of the other battery is needed, whereby the battery loading device having a cylindrical battery chamber and the cover for covering its opening in which, for example, two cylindrical batteries and a one body type battery corresponding to the above can be loaded is provided with a conductive plate on the back surface of the above cover. When the one body type battery is loaded in the wrong direction in such a device and the cover is closed, the positive and the negative electrode of one battery are short whereby not only the battery energy is consumed but there is also the danger of a battery explosion.

In view of the above situation it is an object of the present invention to provide a battery loading device having a cylindrical battery chamber and a cover for covering the chamber in which a number of cylindrical batteries are loaded in parallel and connected in series and also a one body type battery corresponding to the number of batteries, having an asymmetrical section and a projecting positive and a projecting negative electrode at one end can be loaded, whereby the contacts in contact with the electrodes of the loaded one body type battery are spring-shaped at the bottom of the battery chamber. Securing the fixed conductive member at the back surface of the cover, contact reliability is established for both the one body type battery and the cylindrical batteries and furthermore, by making the shape of the opening of the battery chamber almost similar to the asymmetrical section of the one body type battery it is impossible to load the one body type battery in the wrong direction. Furthermore, by providing, at a position on the bottom of the battery chamber at which the cylindrical batteries can be freely loaded, a contact member which is not brought in contat with the battery body when the one body type battery is loaded in the correct direction and is brought in contact with the end surface of the battery when the one body type battery is loaded in the wrong direction to prevent the battery from being loaded beyond a certain limit, the cover cannot be closed when the one body type battery is loaded in the wrong direction so that short circuiting can be avoided.

Furthermore, it often happens that when unit batteries are loaded into the afore mentioned battery loading device, one by one, the already loaded battery falls and prevents the next battery from being loaded. Namely, although the above elliptical in section battery chamber is convenient for the one body type battery, it is not always convenient for the cylindrical unit battery. In order to avoid the above difficulties, in accordance with the present invention, a movable separation plate is provided in the battery loading chamber to separate each of the loaded batteries, whereby the separation member is withdrawn from the battery chamber when the one body type battery is loaded.

SUMMARY OF THE INVENTION

In one form of the invention, a power source battery loading device to be built in appliances having an electrical circuit includes a battery loading chamber for cooperation with either a plural number of cylindrical unit batteries to be loaded in parallel and connected in series or a one body type battery having the same voltage as that of the plural number of cylindrical unit batteries connected in series, being shaped asymmetrical in section and provided with a pair of projecting electrodes at the one end surface. The battery loading chamber is similar to the one body type battery in section and has an opening through which the one body type battery can be loaded and spring-shaped electrodes, on the bottom of the chamber to be brought in contact with the electrodes of the cylindrical unit batteries and those of the one body type battery so as to supply current to the electrical circuit. The apparatus includes a battery chamber cover for covering the opening of the battery loading chamber. The cover has conductive pieces provided on the internal surface to be brought in contact with the electrodes of the plural number of the cylindrical unit batteries so as to connect the batteries in series and an engaging member for holding the cover in the closed state.

Below the present invention will be explained in detail in accordance with the drawings of the embodiments hereof.

BRIEF DESCRIPTION OF THE DRAWINGS

FIGS. 6-9 respectively show another embodiment.

FIG. 6 is a sectional view of the loading device.

FIG. 7 is a sectional view of the cylindrical unit batteries and the one body type battery to be loaded.

FIG. 8 is a central sectional view of the cylindrical unit batteries loaded in the battery loading device.

FIG. 9 is a central sectional view of the one body type battery loaded in the battery loading device.

DESCRIPTION OF THE PREFERRED EMBODIMENT

Figure 1:
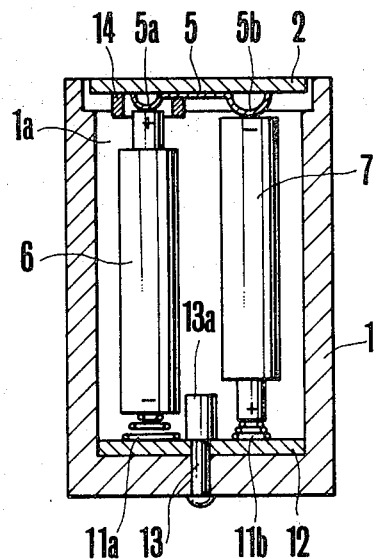
FIG. 1 is a sectional view showing the battery loading device loaded with cylindrical batteries in an embodiment of the present invention.
Figure 4:
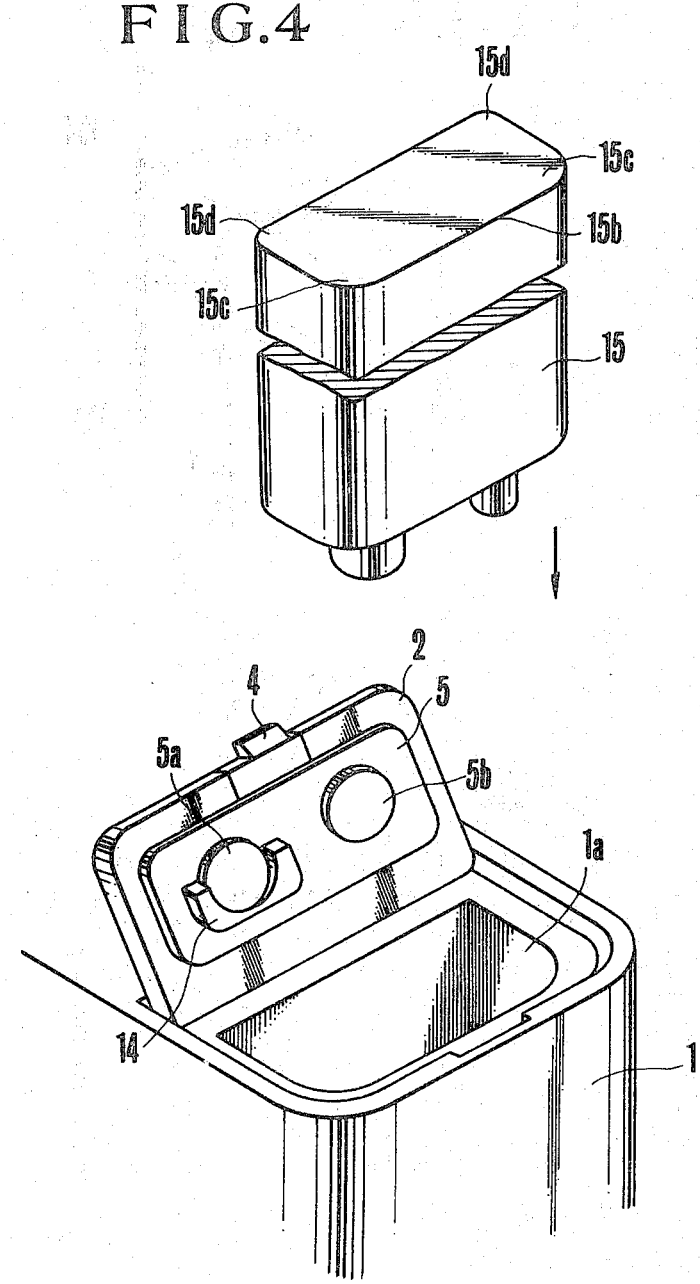
FIG. 4 is a perspective view of the one body type battery loaded in the loading devices shown in FIGS. 1-4 in the correct direction.
Figure 5:
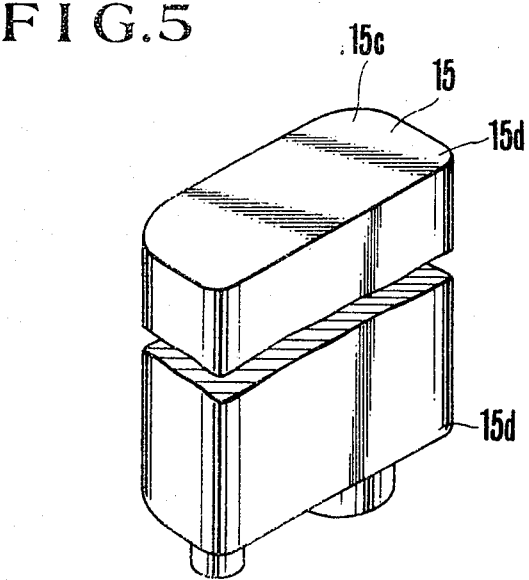
FIG. 5 is a perspective view of the one body type battery loaded in the loading devices shown in FIG. 4 in the wrong direction.
Figure 5:
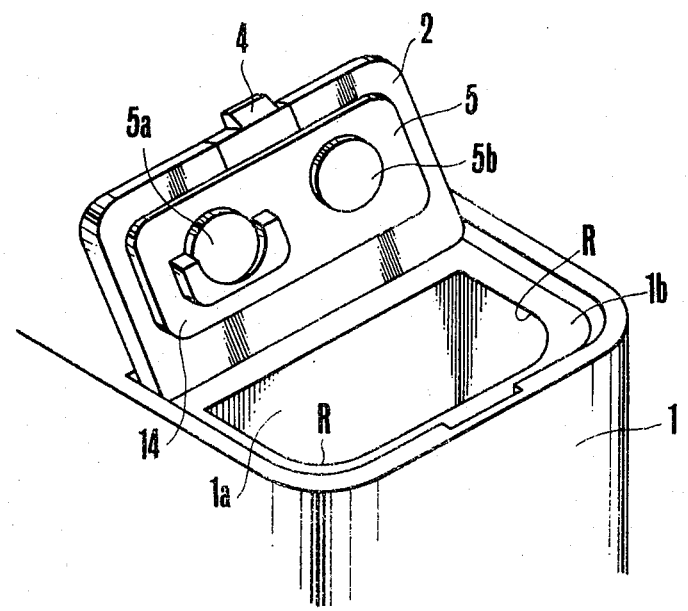

FIG. 1 shows a device body 1, in whose one part the battery loading chamber 1a is provided. A battery loading chamber 1a has sufficient room for loading two conventional cylindrical unit batteries 6, 7. An operable cover 2 covers the opening in the battery loading chamber 1a, and is linked on the device body 1 as is shown in FIGS. 4 and 5 and has an operable engaging claw 4 engageable with the device body 1 so as to hold the battery cover chamber in the closed position. A conductive piece 5 fixed on the internal surface of the battery chamber cover 2, has a contact 5a for the positive electrode of the cylindrical unit battery 6, 7 and a contact 5b for the negative electrode. Around the contact 5a a circular insulation member 14 having an internal diameter smaller than the external diameter of the cylindrical unit battery 6, 7 is secured, whereby the circular insulation member 14 is taller than the contact 5a. Electrode springs 11a and 11b are in contact with the one electrode, urging the other electrode to the contacts 5a and 5b and leading the current from the cylindrical unit battery 6,7 to the device body 1 by means of a conductive means (not shown). An electrode base plate 12 for fixing the electrode springs 11a, 11b, is secured on the bottom of the battery chamber 1a by means of a holding member 13. The holding member 13 has a contact portion 13a brought in contact with a one body type battery 15 at the projecting end, whereby the contact portion 13a is positioned not to be in contact with the cylindrical battery 6, 7. FIG. 1 shows the two cylindrical unit batteries 6 and 7 normally loaded. The insulation member 14 is composed in such a manner that when the battery 7 is inversely loaded the negative electrode is prohibited from being in contact with the contact 5a to prevent counter conductivity. Furthermore, because the cylindrical batteries 6, 7 are loaded independently, there is no large fluctuation of contact pressure even if the cylindrical batteries 6, 7 somewhat vary in dimension due to manufacturing tolerances.

Figure 2:
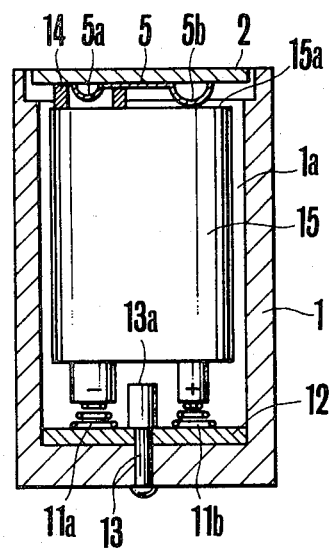
FIG. 2 is a sectional view showing the one body type battery loaded in the loading device shown in FIG. 1.

FIG. 2 shows the one body type battery 15 loaded in the above battery loading chamber 1a. The one body type battery 15 has almost the same sectional shape as the battery loading chamber 1a, is shaped to be loaded in the loading chamber 1a with little room and has the same length as that of the cylindrical unit battery 6, 7. Furthermore, the positive and the negative electrodes project out of one end surface of the battery 15 in alignment. As is shown in the drawing, the positive and the negative electrode of the battery 15 are in contact with the springs 11a and 11b, while the end surface 15a has no electrode depressed against the contact 5b and the insulation member 14. In this situation the electrical circuit of the device body, has the same voltage applied as when the two cylindrical unit batteries 6, 7 are connected in series. When the upper surface of the insulation member 14 is made as tall as that of the contact 5b, there is no danger that the battery 15 will be inclined and the terminals of the battery 15 are surely brought in contact with the springs 5a and 5b. Furthermore, even if there is a small difference in the projection amount of the terminal there is no danger of inferior contact.

Although the contact portin 13a of the holding member 13 projects beyond the surface of the electrodes of the battery 15, it is not in contact with the body of the battery 15 or the electrodes and the one body type battery 15 is loaded normally.

Figure 3:
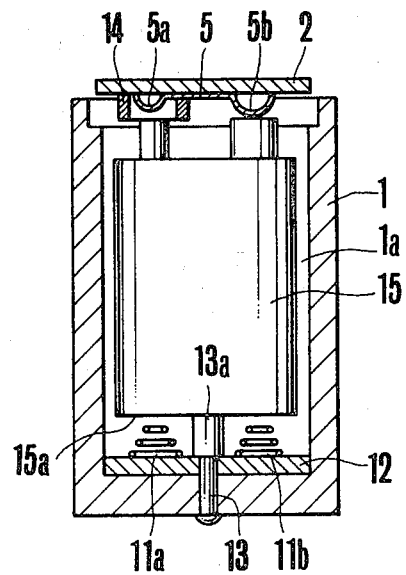
FIG. 3 is a sectional view showing the one body type battery loaded in the loading device in the wrong direction.

FIG. 3 shows the one body type battery 15 inversely loaded by mistake.

In this situation the contact portion 13a of the holding member 13 is in contact with the surface 15a of the battery 15 having no electrode preventing the battery 15 from being pushed in further. Thus, the battery cover 2 cannot be closed completely so that the operator can recognize that the battery 15 has been misloaded.

FIG. 4 shows the sectional shape of the one body type battery 15 and the battery loading chamber 1a. The battery 5 has an almost rectangular section, whereby only the corner 15c in contact with one side 15b is circular shaped with a comparatively large diameter, while the remaining two corners are circular shaped with remarkably small diameters.

The opening and the section of the battery loading chamber 1a is shaped almost equal to the section of the battery 15. In the drawing the battery 15 is directed normally and can be loaded normally if depressed along the direction of the arrow. The battery 5 in FiG. 5 is inverted to that shown in FIG. 4. In this case the corner 15d of the battery projects beyond the circular shaped part R of the opening and is in contact with the edge 1b so that the battery 15 can not be loaded, preventing counter conductivity.

Although in the present embodiment the section of the battery 15 and the battery loading chamber 1a are asymmetrically shaped with reference to the line binding the centers of the two electrodes, the present invention is not limited to that. The same purpose can be achieved when the section of the battery 15 is similar to the opening of the battery loading chamber 1a, there is not a large difference between them in dimension and they have a projection asymmetrical with reference to the center of their sections.

FIGS. 6-9 show further other embodiments.

Figure 6:
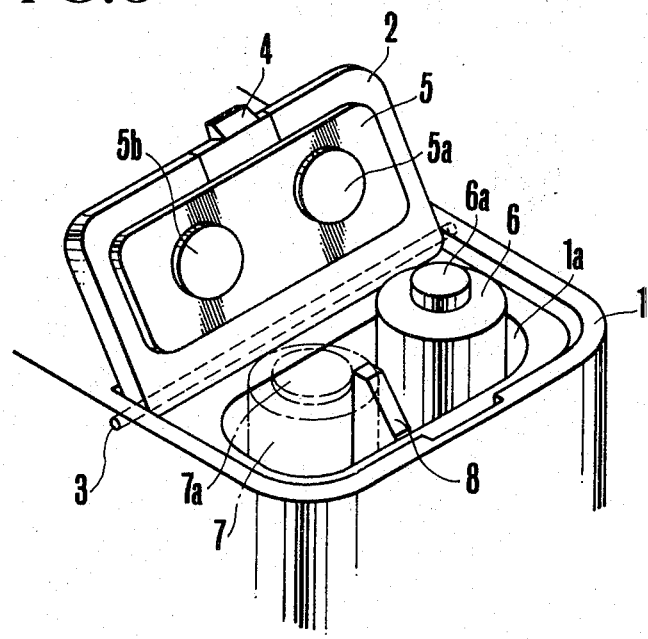
Figure 7:
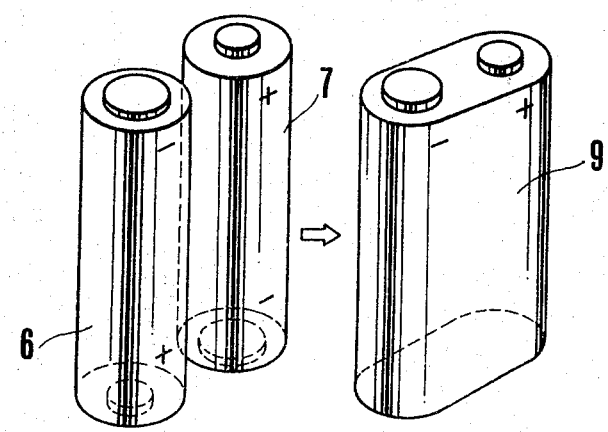
Figure 8:
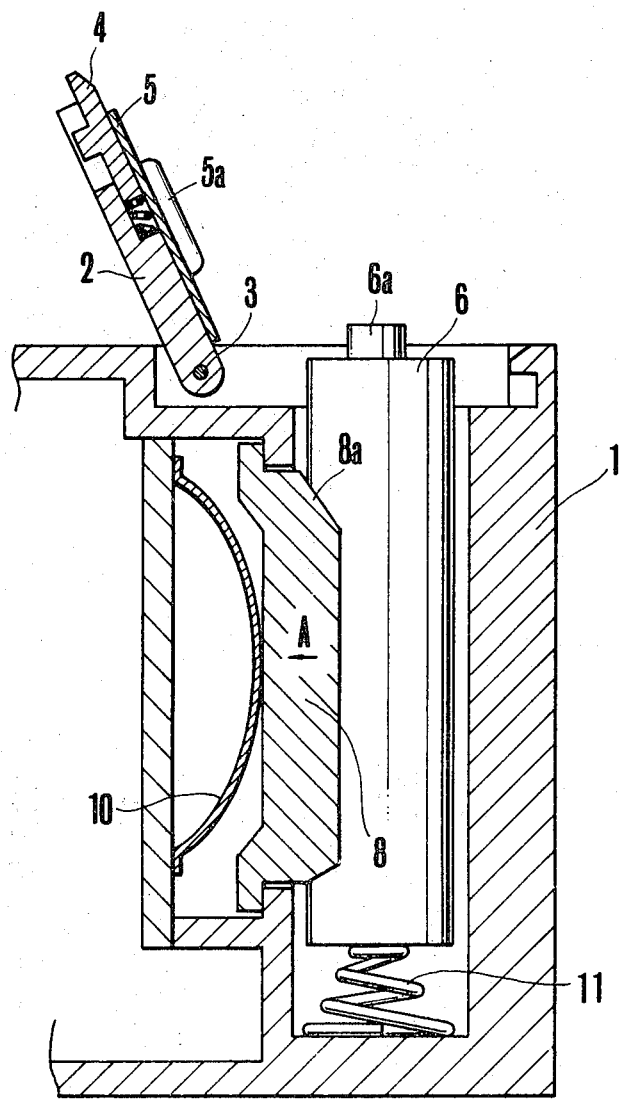

In the drawing, the device body 1 has the battery loading chamber 1a elliptical in section. The battery chamber cover 2 is linked on the device body 1 with a shaft 3. The battery chamber cover 2 has the engaging claw 4 engageable with the body 1, whereby in the closed state of the battery chamber cover 2 the cover 2 is held in engagement, while engagement is released from outside when the cover 2 is opened. The battery chamber cover 2 is provided with the conductive piece 5 and the contacts 5a and 5b of the conductive piece 5 are respectively in contact with a positive electrode 6a and a negative electrode 7a of the battery 15. The movable separation plate 8 projects into the battery chamber 1a so as to prevent the displacement of the battery 15 as is shown in FIG. 6 when the cylindrical batteries 6, 7 are used and retires from the battery chamber 1a when the one body type battery 9 is loaded. FIG. 7 shows the one body type battery to be used for the present embodiment, whereby the one body type battery 9 corresponds to the cylindrical batteries 6 and 7 connected in series and having the external dimension equivalent to the two cylindrical batteries 6, 7 placed side by side. FIG. 8 shows the central section of the battery chamber 1a of the present invention, whereby the cylindrical battery 6 is loaded. In the drawing, the movable separation plate 8 projects into the battery chamber 1a, being urged by the spring 10, while the separation plate 8, which is depressed from outside, is slidable in the direction of the arrow A. A spring 11 is disposed in contact with the one electrode of the battery 6. In FIG. 6 the cylindrical batteries 6, 7 are loaded so that the movable separation plate 8 projects out of the internal wall of the battery chamber 1a. FIG. 9 also shows the central section, whereby the one body type battery 9 shown in FIG. 7 is loaded. In this situation most of the movable separation plate 8 is, being pushed by the one body type battery 9, outside of the battery chamber 1a in such a manner that the loading of the one body type battery 9 is not prevented. Hereby, a part 8a of the movable separation plate 8 is conically shaped in such a manner that the movable separation plate 8 can be slid smoothly when the one body type battery 9 is loaded.

As has been explained in detail in the battery loading chamber 1a of the present invention a number of cylindrical batteries 6, 7 are loaded in the cylindrical battery chamber 1a and connected in series, while the one body type battery 15 corresponding to a plural number of the cylindrical batteries 6, 7 is also used. Hereby, no matter whether the cylindrical batteries 6, 7 or the one body type battery 15 are used, not only is a stabilized contact obtained at the contact part but also all the electrical difficulties due to misloading of the batteries can be avoided.

What we claim:

1. A power source battery loading device to be built in appliances having an electrical circuit comprising:
   a battery loading chamber for selectively loading;
   a plural number of cylindrical unit batteries to be loaded in parallel and connected in series;
   a combined type battery having the same voltage as that of the plural number of the cylindrical unit batteries connected in series, being shaped asymmetrical in section and provided with a pair of projecting electrodes at the one end surface;
   said battery loading chamber being similar to the one body type battery in section, having an opening through which the one body type battery can be loaded and spring-shaped contacts, on the bottom of the chamber to be brought in contact with the electrodes of the cylindrical unit batteries and those of the one body type battery so as to supply current to the electrical circuit; and
   an operable battery chamber cover for covering the opening of the battery loading chamber, said cover having conductive pieces provided on the internal surface to be brought in contact with the electrodes of the plural number of the cylindrical unit batteries so as to connect the batteries in series and an engaging member for holding the cover in the closed state.

2. A battery loading device in accordance with claim 1, further comprising:
   a projecting member provided on the bottom surface of the battery loading chamber, said member being provided at the position at which the correct loading of the one body type battery is not hindered and being brought in contact with the end surface having no terminal of the battery so as to prevent the battery from being loaded when the battery is loaded along the wrong direction.

3. A battery loading device in accordance with claims 1 and 2, wherein the projecting member serves at the same time as a holding member for holding the spring contacts on the bottom surface of the battery loading chamber.

4. A power source battery loading chamber to be build in appliances having an electrical circuit, comprising:
   a battery loading chamber capable of selectively loading;

a plural number of cylindrical batteries loaded in parallel;

a combined type battery having almost the same volume as that of the cylindrical batteries; and a movable separation member to be brought into and out of the battery chamber so as to separate the plural number of the cylindrical batteries in the chamber, said member being withdrawn out of the battery chamber along with the loading of the one combined battery into the battery chamber.

* * * * *